(No Model.)
J. H. CRANDELL.
SEWING MACHINE MOTOR.
No. 293,149. Patented Feb. 5, 1884.
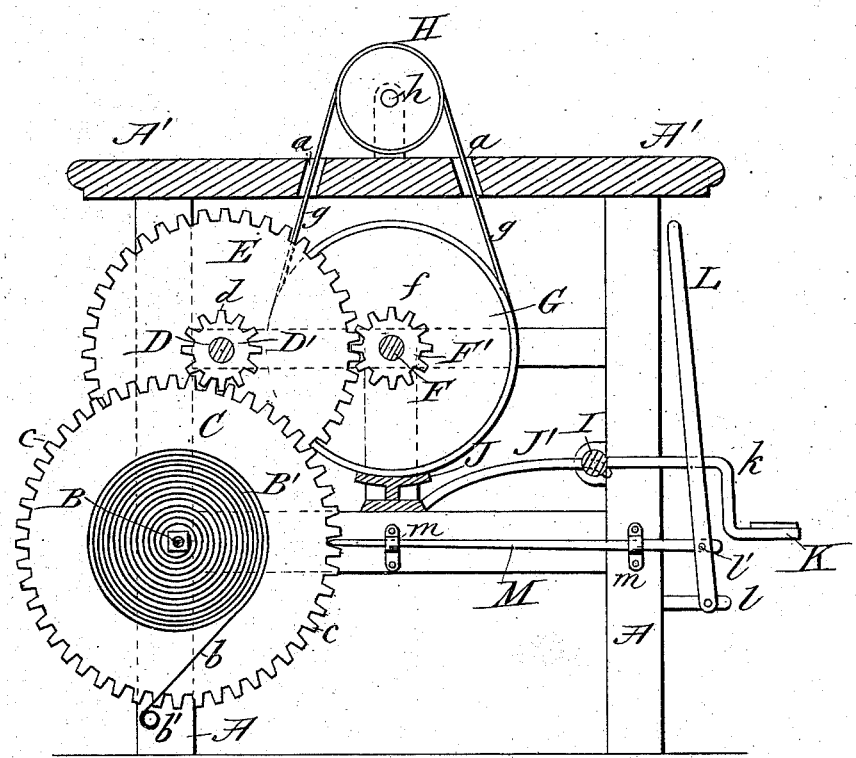
Attest:
F. H. Schott.
John J. Crawford.
Inventor:
James H. Crandell
By A. Crawford atty.

UNITED STATES PATENT OFFICE.

JAMES H. CRANDELL, OF UPPER MARLBOROUGH, MARYLAND, ASSIGNOR OF ONE-HALF TO JAMES FLINT, OF SAME PLACE.

SEWING-MACHINE MOTOR.

SPECIFICATION forming part of Letters Patent No. 293,149, dated February 5, 1884.

Application filed December 14, 1883. (No model.)

*To all whom it may concern:*

Be it known that I, JAMES H. CRANDELL, a citizen of the United States, residing at Upper Marlborough, in the county of Prince George's and State of Maryland, have invented certain new and useful Improvements in Sewing-Machine Motors, of which the following is a specification, reference being had therein to the accompanying drawing, which represents a sectional view.

The object of this invention is to improve that class of sewing-machines which are operated by the power of a spring or springs through a train of gear-wheels or pulleys and belts, that transmit power to and give the necessary motion to the needle-bar of a sewing-machine; and it consists in a simple arrangement of parts, whereby the motion imparted by the spring to the operating parts may be controlled to give any desired speed, or to be entirely stopped whenever necessary.

In the drawing, A represents the supporting-frame, which may be of any desired form or size as the kind of work to be performed thereon may dictate or the intermediate actuating parts between the spring and the needle-bar may require.

A' is the table to support the work that is to be operated upon.

B is a transverse horizontal shaft, in proper bearings in frame A, having one end square, and projecting a proper distance outside the frame A, to permit a winding-key to be applied thereto, to wind the spring close around the shaft, and means for keeping the spring wound.

B' is the spring coiled or wound around the shaft B, one end of which is fast to the shaft or to a drum on the shaft, while the outer end, b, of the spring is secured or attached to or around a transverse rod, b', that is fastened to frame A.

C is a spur-gear wheel fast upon shaft B, having teeth c on its periphery and revolving with shaft B.

D is a horizontal shaft placed above the shaft B, to revolve in suitable bearings in frame A, and having toothed pinion D' thereon so placed that the teeth d thereof will gear with teeth c on wheel C E represents another spur-gear wheel having on its perimeter teeth e, and it revolves with shaft D.

F represents a transverse shaft that revolves in proper bearings in frame A.

F' is a toothed pinion fast on shaft F, and so placed on the shaft that its teeth f will gear into teeth e on wheel E.

G is a band and fly wheel fast on shaft F, and revolves with said shaft F.

g is a band or belt around wheel G, thence upward and through the table-top A at a a, then around pulley H on shaft h, which shaft h communicates motion, through any known instrumentalities, to the needle-bar or to any other operating device desired.

I represents a rock-shaft placed transversely across frame A, and to freely work in proper bearings in the said frame A.

J is a brake-shoe attached to brake-lever J', thence going in a proper direction to and through the rock-shaft I, or so that any rotation of shaft I will move the brake-shoe, through lever J', to or from wheel G, when desired.

K is a treadle, fast to the outer end of rod k, that is bent in proper form to go through or be attached to rock-shaft I, so that by pressing the foot upon the treadle it will rock or turn shaft I and cause the brake-shoe to bear against the rim of wheel G, and thereby control the motion of the actuating parts. The brake-shoe being heavier than the foot-treadle, it will, when free, of itself fall down out of contact with wheel G.

L is a hand-lever, pivoted at its lower end to stud l, that projects from frame A a suitable distance.

M is a reciprocating bar placed horizontally within frame A, and freely sliding in guides m m, pivoted to hand-lever L at l', or so that the lever L will force the inner end of bar M between the teeth c on wheel C; and when the bar is so forced between the teeth c the action of the spring ceases to operate the machine until the stop-bar is forced out from the contact or between the teeth.

This spring-power, described as being applied to sewing-machines, can also be applied to any other simple machine, such as turning-lathes, circular sawing machines, and the like, and the speed may be varied by the introduction of any proper intermediate train of gear-wheels or pulleys and belts.

Having thus fully described my invention, what I claim, and desire to secure by Letters Patent, is—

1. The foot-treadle K, rod $k$, rock-shaft I, lever J', and brake-shoe J, in combination with the wheel G, substantially as and for the purposes described.

2. The pivoted hand-lever L, reciprocating bar M, and guides $m$, in combination with the tooth-wheel C, as and for the purposes described.

In testimony whereof I affix my signature in presence of two witnesses.

JAMES H. CRANDELL.

Witnesses:
B. F. MORSELL,
JOHN J. CRAWFORD.